(No Model.)

F. S. HARRINGTON.
COVERING FOR ELECTRICAL CONDUCTORS.

No. 298,751.              Patented May 20, 1884.

WITNESSES.
James E. Arnold
M. C. Arnold

INVENTOR
Frank S. Harrington
Benj. Arnold
Atty

UNITED STATES PATENT OFFICE.

FRANK S. HARRINGTON, OF PROVIDENCE, RHODE ISLAND, ASSIGNOR TO HIMSELF AND HERBERT N. FENNER, OF SAME PLACE.

COVERING FOR ELECTRICAL CONDUCTORS.

SPECIFICATION forming part of Letters Patent No. 298,751, dated May 20, 1884.

Application filed January 15, 1884. (No model.)

*To all whom it may concern:*

Be it known that I, FRANK S. HARRINGTON, of the city and county of Providence, and State of Rhode Island, have invented certain new and useful Improvements in Coverings for Electrical Conductors, of which the following is a full and correct description, reference being had to the accompanying drawings, forming a part of this specification.

This invention consists in taking a thin strip of copper or brass corrugated longitudinally, and after passing it through a "soldering-fluid," so called, which is usually a chloride of zinc, passing it through a bath of melted tin or solder to coat it thoroughly. It is then wound on the wire that has previously been covered with some insulating material. In winding it the edges of the strip of metal are made to overlap each other, so that when the covered wire is passed through the bath of melted tin or solder again the overlapping edges of the stirrup will be united by the tin or solder, and become impervious to moisture, which will otherwise enter and impair the non-conducting qualities of the inclosed insulating material.

Figure 2:
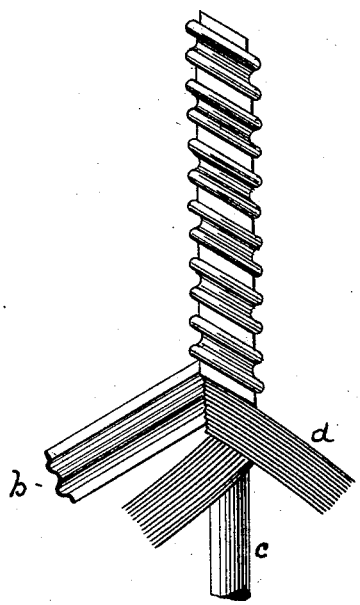
Figure 1:
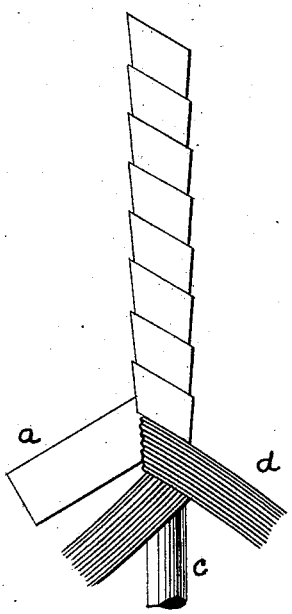
Figure 3:

When the electrical conductor is intended for use in such position as will not require bending, the plain flat strips shown in Figure 1, *a*, may be used; but for purposes where it is necessary to bend it I first roll the strip between two rolls, or otherwise give it a curve, with a flat space each side of it lengthwise of the strip, as shown in section in Fig. 3, or make one or more corrugations in the strip, as shown in Fig. 2, *b*. By this corrugation the strip is made capable of stretching sidewise, as would be required on the outside of a curve in the conductor, and also capable of compression suitable for the inside of the curve, and the joints between the strips will not be broken open, as they would be liable to be if the strips of metal were perfectly flat. This quality of expansion and contraction would be acquired in sufficient degree to allow the conductor to be bent and straightened repeatedly, as in coiling for transportation and uncoiling for use and rebending when put in position.

In Fig. 1 the wire *c* is represented as first being covered with an insulating material, *d*, and then wound with the plain strip of metal *a*. In Fig. 2 the outside strip *b* is shown corrugated.

What I claim as my invention is—

A covering for insulated electrical conductors, consisting of a thin strip of metal corrugated lengthwise in its middle, and wound spirally around the conductor with the edges of the strip overlapping each other, substantially as described, and for the purpose set forth.

FRANK S. HARRINGTON.

Witnesses:
JOSEPH F. BLANVELT,
BENJ. ARNOLD.